(12) United States Patent
Newberry, Jr. et al.

(10) Patent No.: US 8,726,844 B1
(45) Date of Patent: May 20, 2014

(54) REMOTE ANIMAL RESTRAINING DEVICE AND METHOD

(75) Inventors: Lawrence H. Newberry, Jr., Ashland, OR (US); David Carlton Sanders, Medford, OR (US)

(73) Assignee: One Device, LLC

( * ) Notice: Subject to any disclaimer, the term of this patent is extended or adjusted under 35 U.S.C. 154(b) by 129 days.

(21) Appl. No.: 13/493,813

(22) Filed: Jun. 11, 2012

(51) Int. Cl.
*A01K 15/02* (2006.01)
*A01K 15/04* (2006.01)

(52) U.S. Cl.
USPC .......................................................... 119/720

(58) Field of Classification Search
USPC ................................. 119/720, 712, 850, 721
See application file for complete search history.

(56) References Cited

U.S. PATENT DOCUMENTS

| | | | |
|---|---|---|---|
| 962,890 | A | 6/1910 | Byrd et al. |
| 3,502,073 | A | 3/1970 | Stanley |
| 4,528,944 | A | 7/1985 | Reed et al. |
| RE32,547 | E | 11/1987 | Reed et al. |
| 4,919,082 | A | 4/1990 | Tsai |
| 6,311,645 | B1 | 11/2001 | Brown |
| 6,352,053 | B1 | 3/2002 | Records et al. |
| 6,354,247 | B1 | 3/2002 | Andrews |
| 6,487,992 | B1 | 12/2002 | Hollis |
| 6,725,810 | B2 | 4/2004 | Schwartz |
| 6,859,939 | B1 | 3/2005 | Osburn, Sr. |
| 7,150,248 | B2 | 12/2006 | Hodl |
| 7,617,800 | B2 | 11/2009 | Trescott |

*Primary Examiner* — Monica Williams

(57) ABSTRACT

A remote animal restraining device includes a device collar having a panel storage compartment, at least one panel storage compartment door pivotally carried by the device collar and positional between open and closed positions relative to the panel storage compartment, a flexible restraining panel carried by the panel compartment door in the panel storage compartment, a door release mechanism carried by the device collar and adapted to normally retain the panel storage compartment door in the closed position and a remote control adapted to remotely activate the door release mechanism.

20 Claims, 8 Drawing Sheets

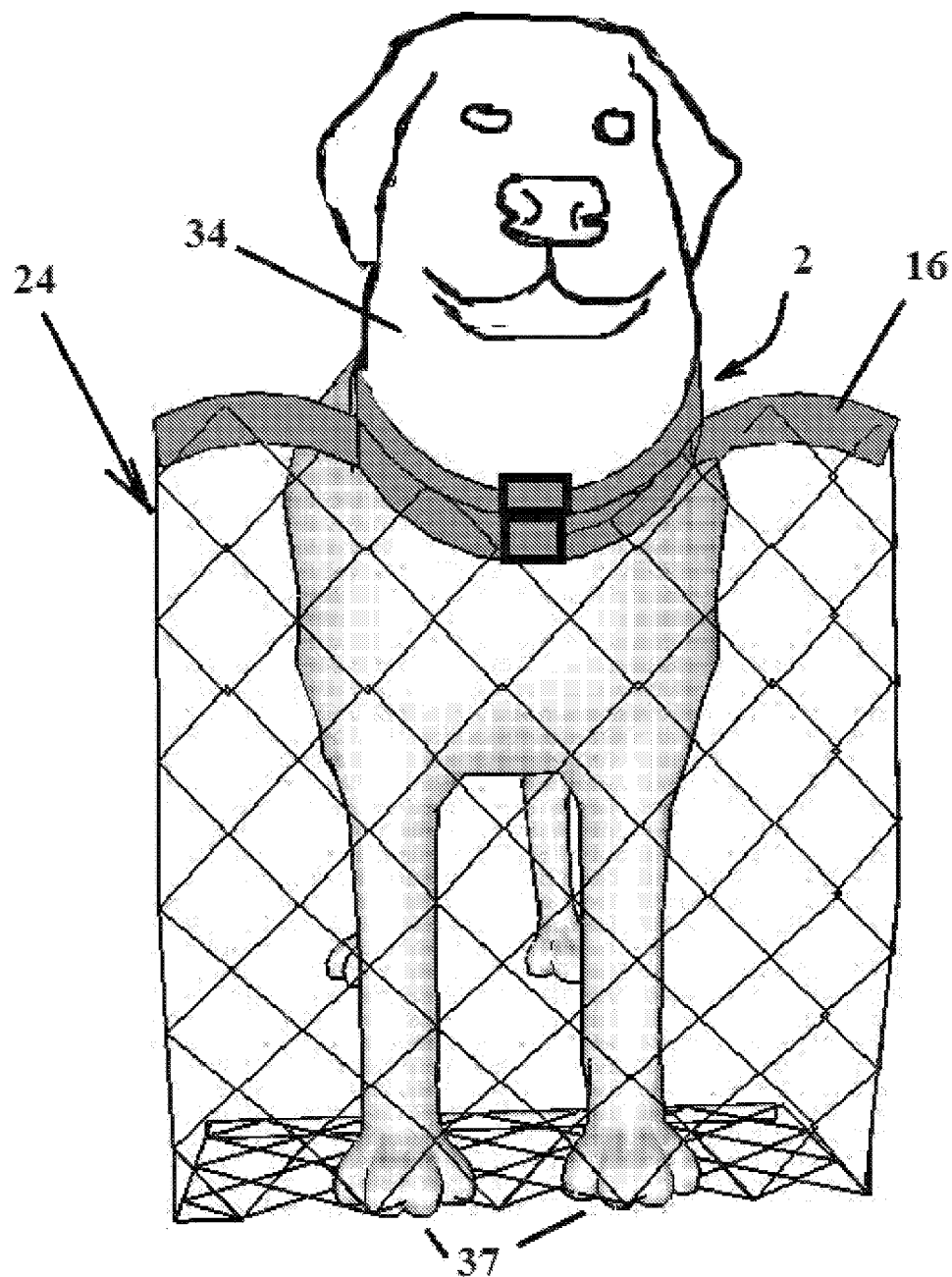

REMOTE ANIMAL RESTRAINING DEVICE AND METHOD

FIELD OF THE INVENTION

Illustrative embodiments of the disclosure generally relate to devices for restraining a moving animal. More particularly, illustrative embodiments of the disclosure relate to a remote animal restraining device which restrains a running or charging animal without injury to the animal and a remote animal restraining method.

BACKGROUND OF THE INVENTION

In the handling of animals, it is often necessary to stop a fleeing, charging or attacking animal. An unruly animal can pose a risk of injury to the animal itself, other animals, property or humans. Additionally, it is often necessary to restrain an animal during training of the animal. In the case of pets or other animals which are deemed to have value, it is desirable to restrain the animal in such a manner that the animal remains unharmed and in control There are many types of animal restraining devices and methods currently in use. While they are one of the most secured method of restraining an animal, cages are also one of the most restrictive and least humane and are also high maintenance. Moreover, as it is placed into or removed from the cage, the animal typically has an opportunity to escape.

Fenced-in areas are another method of restricting an animal to a particular area. Although this may allow an animal increased range of movement as compared to a cage, it also provides the animal with greater opportunities to escape as the animal is moved into or removed from the fenced area.

Another common method of restraining an animal involves physically connecting a collar or harness which is worn by the animal to a stationary object by means of a cord or cable. This method restricts the animal's movement to the length of the cord. This type of restraint has many drawbacks including the possibility of the cord becoming tangled around other stationary objects as well as the animal itself. As with other animal restraining methods, connecting an animal to and disconnecting the animal from a stationary object also offers the animal an opportunity to escape.

Another common technique for restraining an animal includes use of a leash which is attached to a collar or harness worn by the animal. Although this method provides the most range of movement to the animal, it has some of the same drawbacks as the previously-mentioned methods as well as drawbacks of its own. For example, the leash can become entangled, the animal can escape while the leash is being connected to and disconnected from, and the animal can pull free from the person holding the leash. In extreme cases, the animal may still be attached and overpower the person holding the leash, possibly dragging and injuring the person, particularly in cases in which a small child holds a leash attached to a large dog.

Other techniques for restraining or constraining an animal include the use of electronic fences and shock collars, both of which rely more on training than restraint for keeping an animal within a defined area and under control. These techniques allow virtually unlimited opportunity for an animal to escape.

Accordingly, there is a need for a remote animal restraining device and method which allow complete freedom of an animal's movement and provide a caregiver of the animal with the ability to stop and restrain the animal at any time.

SUMMARY OF THE INVENTION

The disclosure is generally directed to a remote animal restraining device for restraining an animal. An illustrative embodiment of the remote animal restraining device includes a device collar adapted for placement around the neck of the animal and having a panel storage compartment, at least one panel storage compartment door pivotally carried by the device collar and positional between open and closed positions relative to the panel storage compartment, a flexible restraining panel carried by the panel compartment door in the panel storage compartment, a door release mechanism carried by the device collar and adapted to normally retain the panel storage compartment door in the closed position and a remote control adapted to remotely activate the door release mechanism whereby the door release mechanism releases the panel storage compartment door to the open position and the restraining panel deploys to a functional position beneath the panel storage compartment door and the feet of the animal tread on the restraining panel such that the restraining panel prevents the animal from stepping forward or rearward.

The disclosure is further generally directed to a remote animal restraining method. An illustrative embodiment of the remote animal restraining method includes providing a remote animal restraining device having a device collar and a restraining panel selectively releasable from the device collar, placing the device collar of the remote animal restraining device around the neck of an animal and remotely deploying the restraining panel from the device collar in front of the front legs and under the feet of the animal to stop the animal from walking or running. The very act of this compartment door opening will distract the animal from whatever it was running towards, and the very next step the animal takes will place its foot on the panel, and immediately cause the neck and foot to oppositely oppose movement, stopping the animal immediately in its tracks.

This can also be used as a training device when configured with a warning alarm buzzer on the device, and a button on the remote that sounds the alarm buzzer.

BRIEF DESCRIPTION OF THE DRAWINGS

Illustrative embodiments of the disclosure will now be described, by way of example, with reference to the accompanying drawings, in which:

FIG. 11 is a front view of the device collar with the restraining panel deployed from the device collar and the front feet of an animal stepping on the deployed restraining panel in exemplary application of the remote animal restraining device.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" as used herein are intended for descriptive purposes only and are not necessarily intended to be construed in a limiting sense.

Figure 5:
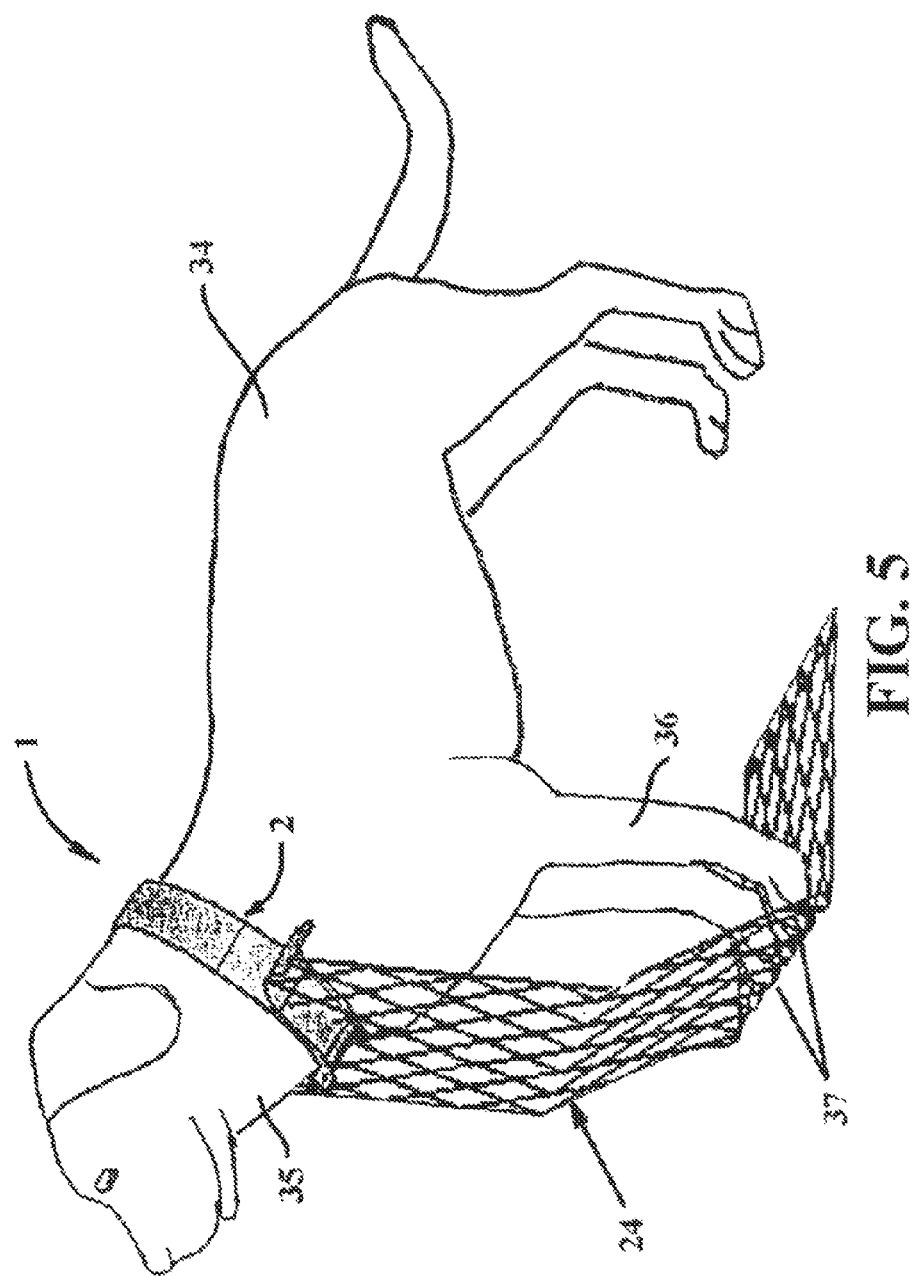
FIG. 5 illustrates the restraining panel deployed from the device collar to stop the animal from running or walking by means of the animal's feet stepping or standing on one end of the panel material, and the other end of the panel material connected to the neck of the animal.

Referring initially to FIG. 5 of the drawings, an illustrative embodiment of the remote animal restraining device, hereinafter device, is generally indicated by reference numeral 1. As will be hereinafter further described, the device 1 includes a device collar 2 which is adapted to be placed on the neck 35 of an animal 34. A panel storage compartment 12 (FIG. 2) is provided in the device collar 2. A flexible restraining panel 24 is normally contained in a folded or compressed configuration in the panel storage compartment 12. Under circumstances in which it is desired to stop the animal 34 from running, such as in the event that the animal 34 is charging or attacking an animal or person, or is about to run in front of a moving vehicle or is escaping, for example, a caregiver (not illustrated) of the animal 34 can selectively release the restraining panel 24 from the device collar 2 in front of the animal 5 by remote control. Accordingly, the animal 34 stepping on the restraining panel 24 stops the animal 34 from running or walking and prevents the animal 34 from further charging or attacking the animal or person, from escaping or from running in front of the moving vehicle.

Figure 1:
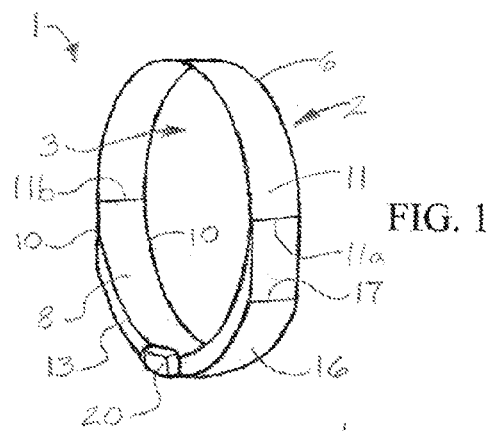
FIG. 1 is a perspective view of a device collar of an illustrative embodiment of the remote animal restraining device.
Figure 2:
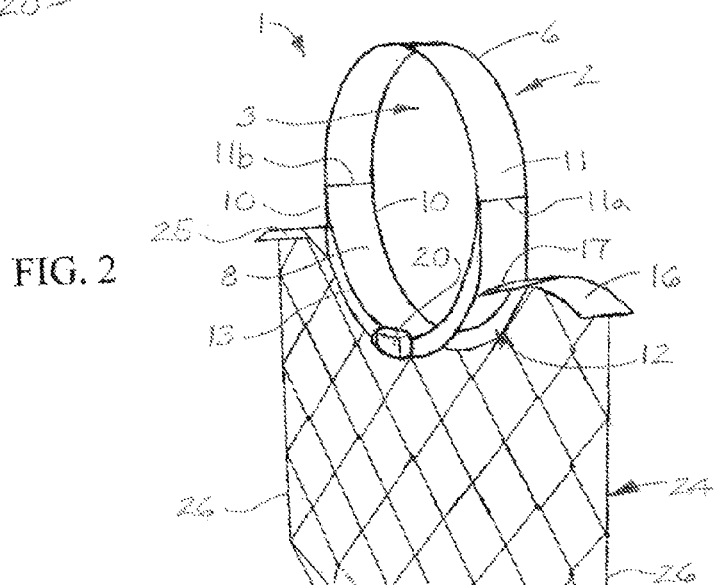
FIG. 2 is a perspective view of the device collar with a restraining panel deployed from the device collar in exemplary application of the remote animal restraining device.

Referring next to FIGS. 1-3, 7, 8, and 8A, the device collar 2 of the device 1 has a collar opening 3, as illustrated in FIGS. 1 and 2. The device collar 2 may be plastic, metal and/or other suitable material and may include a generally semicircular upper collar segment 6 and a generally semicircular lower collar segment 8 which completes the upper collar segment 6. The device collar 2 has generally parallel, spaced-apart collar edges 10 and an exterior collar surface 11. The device collar 2 may have a collar hinge 11a which facilitates selective opening and closing of the upper collar segment 6 relative to the lower collar segment 8 and a collar fastener 11b which locks the upper collar segment 6 to the lower collar segment 8.

As illustrated in FIG. 2, the panel storage compartment 12 may be provided on or in the lower collar segment 8 of the device collar 2. In some embodiments, a pair of generally spaced-apart, parallel compartment flanges 13 may extend from the opposite collar edges 10 of the lower collar segment 8 of the device collar 2. The panel storage compartment 12 may be formed by the exterior collar surface 11 of the lower collar segment 8 and the compartment flanges 13.

Figure 3:
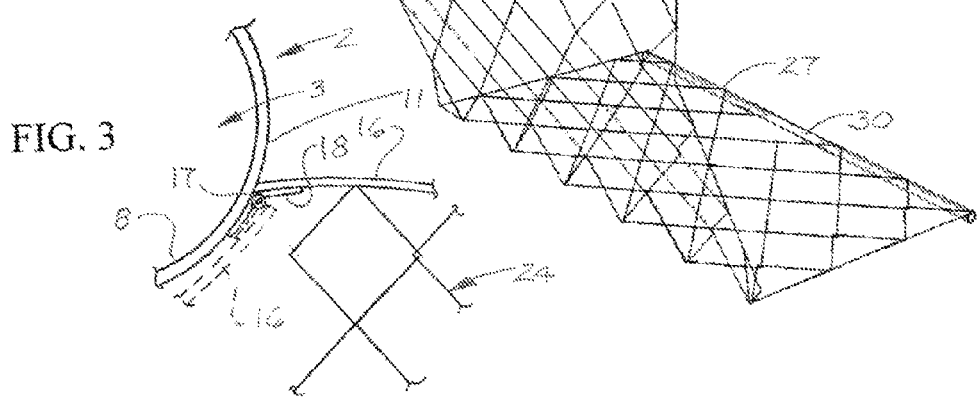
FIG. 3 is a sectional view of a portion of the device collar with the restraining panel (partially in section) deployed from the device collar, more particularly illustrating an exemplary technique for pivotally attaching a spring-loaded panel storage compartment door to the device collar.

At least one compartment door 16 is provided on the device collar 2. Each compartment door 16 is positional between a closed position (FIG. 1) and an open position (FIG. 2). As illustrated in FIG. 3, each compartment door 16 may be pivotally attached to the exterior collar surface 11 on a corresponding side of the lower collar segment 8 at a corresponding door hinge 17. A door spring 18 normally biases each compartment door 16 in the outwardly-extended open position illustrated in FIGS. 2 and 3. A door release mechanism 20 is provided on the lower collar segment 8 of the device collar 2. The door release mechanism 20 is adapted to engage and secure the compartment doors 16 in the closed position of FIG. 1 against the outward bias imparted to the compartment doors 16 by the door springs 18 (FIG. 3). The door release mechanism 20 may also contain a buzzer, and can be selectively activated to sound the alarm buzzer, or release the compartment doors 16 such that the compartment doors 16 spring open from the closed position of FIG. 1 to the open position of FIG. 2, as will be hereinafter described.

Figure 7:
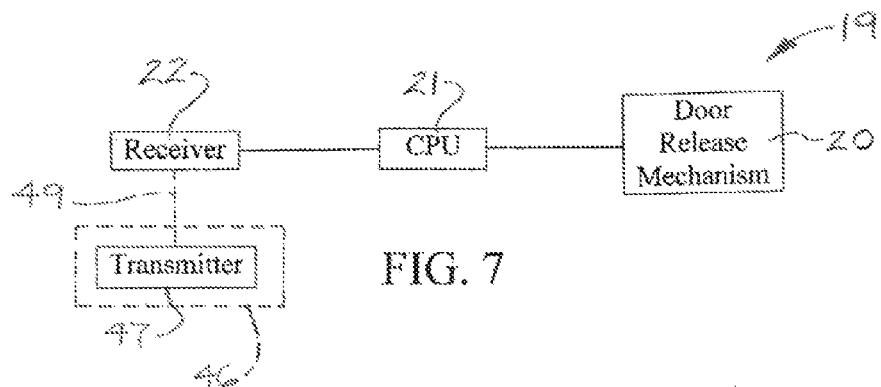
FIG. 7 is a block diagram illustrating an exemplary remote activation system for the remote animal restraining device.
Figure 8:
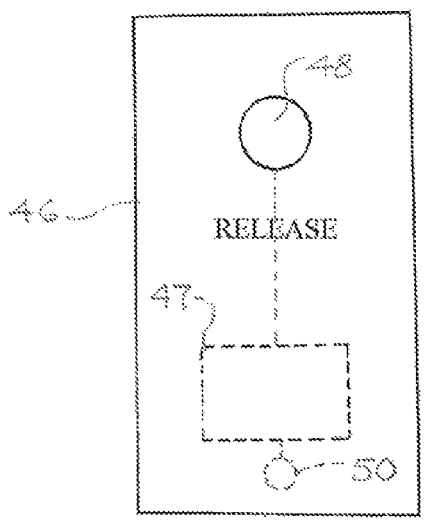
FIG. 8 is a top view of an exemplary remote control which is suitable for implementation of the remote animal restraining device.
Figure 8A:
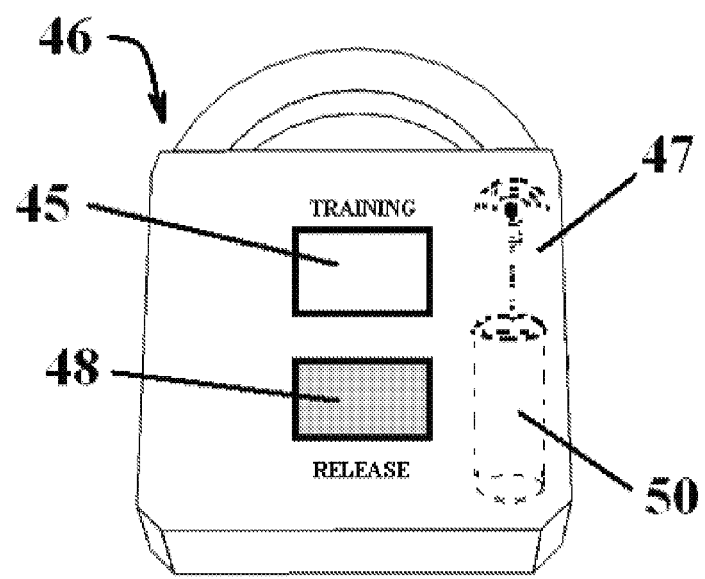
FIG. 8A is a top view of an alternative embodiment of the device of FIG. 8 that also shows one configuration that could be used for a training alarm buzzer.

As illustrated in FIGS. 7 and 8A, the door release mechanism 20 may be part of a remote activation system 19 which facilitates selective opening of the compartment doors 16 by activation of a remote control 46. The remote activation system 19 may include the remote control 46, in which a transmitter 47 is provided. A battery 50 may be disposed in electrical communication with the transmitter 47. A release button 48 may be provided on the remote control 46. The release button 48 is connected to the transmitter 47 in such a manner that manipulation of the release button 48 activates the transmitter 47, which emits a radio frequency (RF) activation signal 49 (FIG. 7).

As illustrated in FIG. 7, a receiver 22 is adapted to receive the activation signal 49 emitted by the transmitter 47. The door release mechanism 20 may interface with the receiver 22 through a CPU 21. Accordingly, upon receiving the activation signal 49 emitted by the transmitter 47, the receiver 22 activates the door release mechanism 20 such as through the CPU 21. The door release mechanism 20 releases the typically spring-loaded compartment doors 16 (FIGS. 1 and 2), which open as illustrated in FIG. 2. This signal may also be used to enable an alarm buzzer (built into the device) instead of, or in addition to the panel deploying, for training purposes.

The flexible restraining panel 24 is attached to the interior surfaces of the respective compartment doors 16 and interior of compartment 12. The restraining panel 24 may be generally rectangular with an upper panel edge 25; a pair of elongated, parallel side panel edges 26; and a bottom panel edge 27. The upper panel edge 25 may be attached to the compartment doors 16 via adhesive, mechanical fasteners and/or other suitable technique known by those skilled in the art. The restraining panel 24 may be a relatively lightweight, yet relatively strong fabric or netting and may vary in size, weight and strength depending on the size of the animal which is to be restrained in application of the remote animal restraining device 1. Depending on the material which is selected for the restraining panel 24, at least one panel weight 30 may be provided on the restraining panel 24, as illustrated in FIG. 2. The panel weight 30 may be provided near or along the bottom panel edge 27 of the restraining panel 24. The width of the restraining panel 24 is sufficient to span the outside shoulder width of an animal 34 on which the device 1 is deployed. The length of the restraining panel 24 is sufficient to span longer than the distance between the lower collar segment 8 and the animal's feet 37 of the animal 34.

Figure 4:
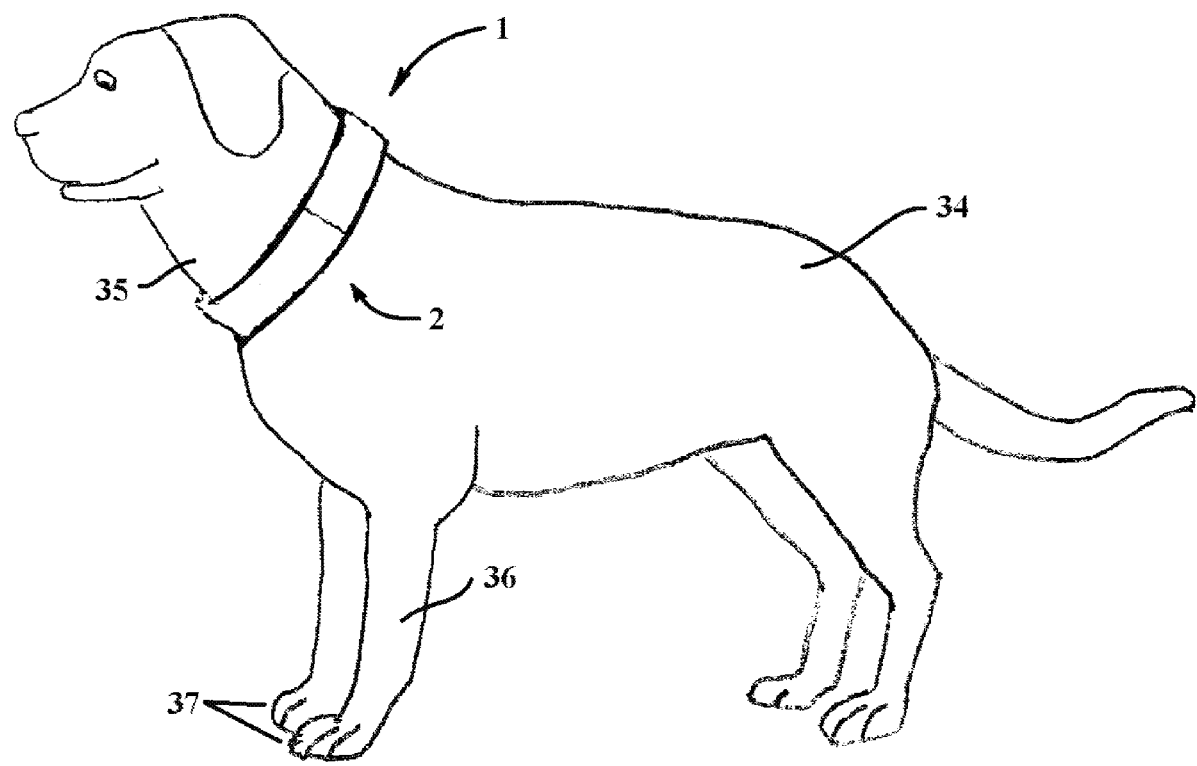
FIG. 4 is a side perspective view of an animal, with the device collar of the remote animal restraining device fitted on the neck of the animal in exemplary application of the device.

Referring next to FIGS. 4, 5 and 11 of the drawings, in exemplary application of the device 1, the device collar 2 is fastened around the neck 35 of an animal 34 to stop the animal 34 from running in the event that the animal 34 charges or attacks another animal or person or is about to run in front of a moving vehicle or escaping, for example. A caregiver (not illustrated) of the animal 34 holds the remote control 46 (FIG. 8A). In the event that the animal 34 begins to display aggressive behavior toward another animal or person or begins running in an attempt to escape the caregiver or runs toward a street, highway or intersection, the caregiver depresses the release button 48 on the remote control 46. Accordingly, as illustrated in FIG. 7, the transmitter 47 in the remote control 46 transmits a activation signal 49 to the receiver 22 of the remote activation system 19. In turn, the CPU 21 activates the door release mechanism 20, which releases the compartment doors 16 on the device collar 2. The spring-loaded compartment doors 16 open and expose the panel storage compartment 12 such that the restraining panel 24 drops from the panel storage compartment 12 and unfurls in front of the front legs 36 and front feet 37 of the animal 34, as illustrated in FIG. 5. In some embodiments, the panel weight or weights 30 (FIG. 2) may enhance the dropping or unfurling action of the restraining panel 24. As the animal 34 continues running or walking forward, the front feet 37 of the animal 34 step on the restraining panel 24, as illustrated in FIGS. 5 and 11, preventing the animal 24 from further walking or moving forward. The caregiver can then walk over to the animal 34 and take steps to further restrain the animal 34.

After use of the device 1, the device collar 2 can be unfastened and removed from the neck 35 of the animal 34. The restraining panel 24 can be compacted or folded back into the panel storage compartment 12 and the compartment doors 16 closed and latched by the door release mechanism 20. The device 1 can be re-used as was heretofore described with respect to FIGS. 4 and 5.

It will be appreciated by those skilled in the art that the device 1 provides a method to stop an animal 34 that has free movement in the event that the animal 34 attacks or charges another animal or person, attempts to escape or runs toward a street, highway or intersection without trauma or injury to the animal. Moreover, the device 1 is applicable to a variety of animals having various sizes including but not limited to pets, stage animals, circus animals, zoo animals or animals under another's care such as kennels, veterinarians and dog walkers. Numerous variations of the device 1 are possible depending on the particular size and type of animal 34 to which the device 1 is applied. For example, the restraining panel 24 may be made of a fabric material and in a relatively small size for relatively small animals such as dogs or may be made of ropes, nets or chains and in a large size for larger animals such as elephants.

In an alternative embodiment of the remote animal restraining device, an electronic monitoring system may be used to monitor the location of the animal 34 and activate the door release mechanism 20 in the event that the animal 34 strays beyond a predetermined area or range. In another alternative embodiment, the device collar 2 may be fitted with a sounding device (not illustrated) which may be activated via the remote control 46 (FIG. 8A) for training purposes.

Figure 6:
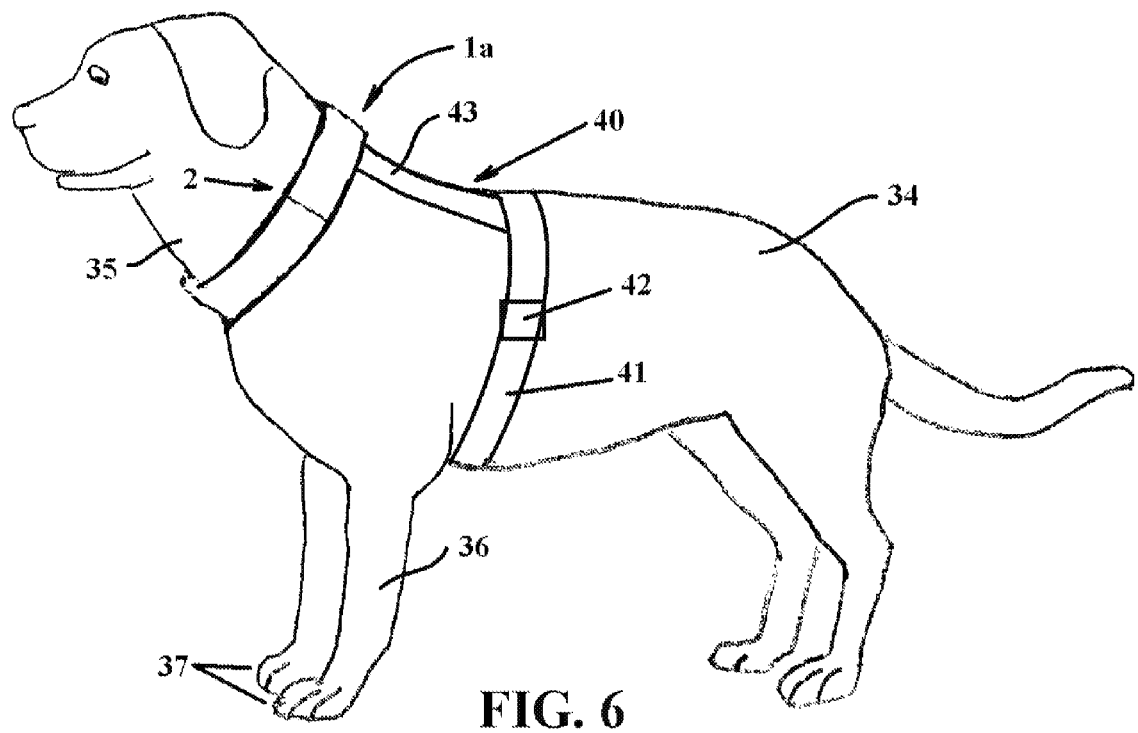
FIG. 6 is a side perspective view of an animal, with an illustrative harness embodiment of the remote animal restraining device fitted on the neck and chest of the animal in exemplary application of the device.
Figure 10:
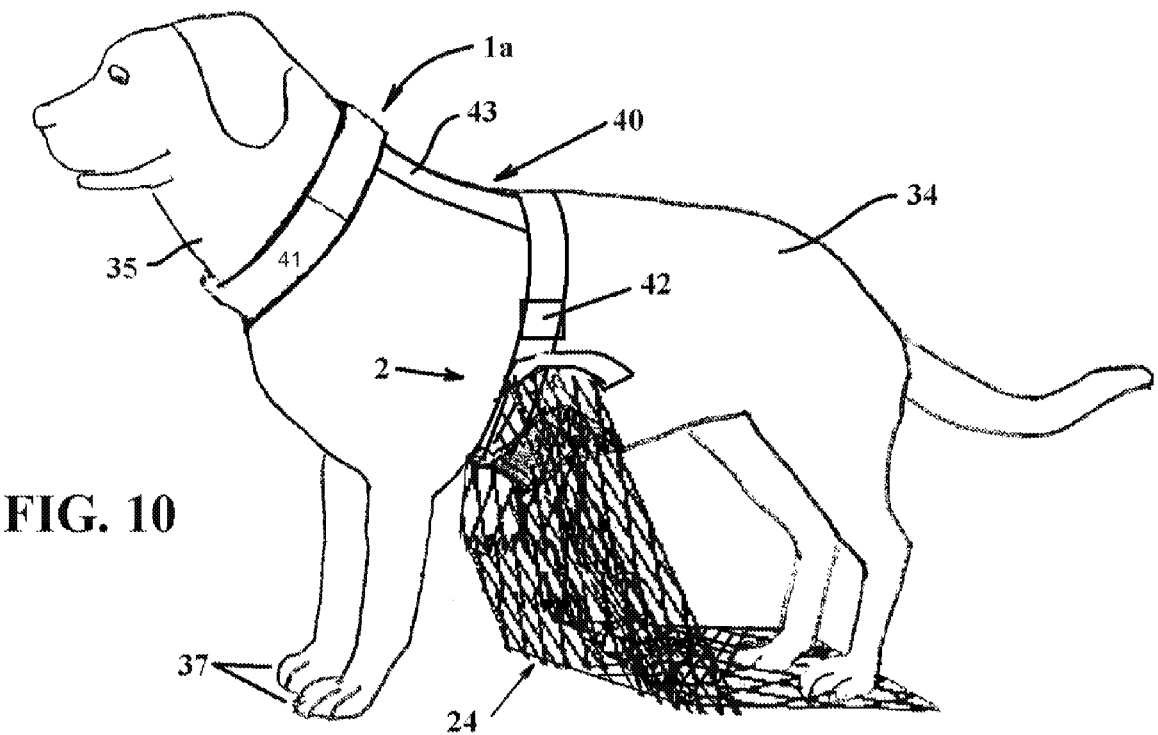
FIG. 10 is a side view of an illustrative harness embodiment of the remote animal restraining device, with the restraining panel deployed in exemplary application of the device.

Referring next to FIGS. 6 and 10 of the drawings, an alternative illustrative embodiment of the remote animal restraining device is generally indicated by reference numeral 1a. The device 1a may include a device collar 2 as was heretofore described with respect to the device 1 in FIGS. 1-3. The device collar 2 may be part of a harness 40 which is fastened on the animal 34. The harness 40 may include a harness collar 41 which is adapted to be fastened around the neck 35 of the animal 34. The device collar 2 may be adapted to be fastened behind the front legs 36 of the animal 34. At least one connecting strap 43 may connect the harness collar 41 to the device collar 2. Use of the device 1a may be as was heretofore described with respect to the device 1. FIG. 10 shows the restraining panel 24 deployed from the device collar 2 in exemplary application of the device 1a. Accordingly, the restraining panel 24 is dropped and unfurled behind the front legs 36 and in front of the rear legs 38, which will prevent the animal 34 from moving forward since the rear feet 39 will step on the restraining panel 24. The restraining panel 24 also prevents the animal 34 from moving backwards since in that case the front feet 37 will step on the restraining panel 24.

Figure 9:
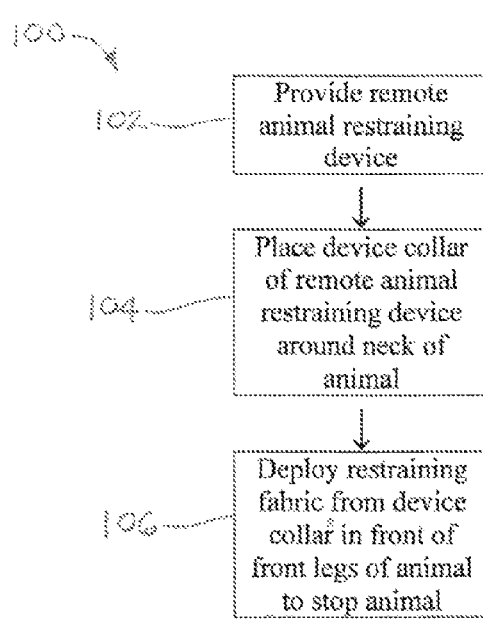
FIG. 9 is a flow diagram of an illustrative embodiment of a remote animal restraining method.

Referring next to FIG. 9 of the drawings, a flow diagram 100 of an illustrative embodiment of a remote animal restraining method is illustrated. In block 102, a remote animal restraining device having a device collar and a restraining panel selectively releasable from the device collar is provided. In block 104, a device collar of the remote animal restraining device is placed around the neck of an animal. In block 106, a restraining panel is remotely deployed from the device collar in front of the front legs of the animal to stop the animal from running or walking. In subsequent steps, the device collar may be removed from the animal and the restraining panel may be returned to a folded or compressed pre-release storage configuration for repeated use.

While illustrative embodiments of the disclosure have been described above, it will be recognized and understood that various modifications can be made and the appended claims are intended to cover all such modifications which may fall within the spirit and scope of the disclosure.

What is claimed is:

1. A remote animal restraining device for restraining an animal, comprising:
    a device collar adapted for placement around the neck of the animal and having a panel storage compartment;
    at least one panel storage compartment door pivotally carried by the device collar and positional between open and closed positions relative to the panel storage compartment;
    a flexible restraining panel carried by the panel compartment door in the panel storage compartment;
    a door release mechanism carried by the device collar and adapted to normally retain the panel storage compartment door in the closed position; and
    a remote control adapted to remotely activate the door release mechanism whereby the door release mechanism releases the panel storage compartment door to the open position and the restraining panel deploys to a functional position beneath the panel storage compartment door and the feet of the animal tread on the restraining panel such that the restraining panel prevents the animal from stepping forward or rearward.

2. The remote animal restraining device of claim 1 wherein the device collar comprises a first semicircular collar segment and a second semicircular collar segment carried by and openable with respect to the first collar segment.

3. The remote animal restraining device of claim 1 wherein the restraining panel comprises fabric.

4. The remote animal restraining device of claim 1 wherein the restraining panel comprises a panel material.

5. The remote animal restraining device of claim 1 wherein the restraining panel is generally elongated and rectangular.

6. The remote animal restraining device of claim 1 further comprising at least one panel weight carried by the restraining panel.

7. The remote animal restraining device of claim 1 wherein the at least one panel storage compartment door comprises a pair of panel storage compartment doors.

8. The remote animal restraining device of claim 1 further comprising at least one door spring normally biasing at least one panel storage compartment door in the closed position.

9. The remote animal restraining device of claim 1 further comprising a harness and wherein the device collar is part of the harness.

10. A remote animal restraining device for restraining an animal, comprising:
    a device collar adapted for placement around the neck of the animal, the device collar having a pair of collar edges, an exterior collar surface, a pair of spaced-apart compartment flanges extending from the collar edges and a panel storage compartment formed by the exterior collar surface and the compartment flanges;
    at least one panel storage compartment door pivotally carried by the device collar and positional between open and closed positions relative to the panel storage compartment;
    at least one door spring normally biasing the panel storage compartment door in the closed position;
    a flexible restraining panel carried by the panel compartment door in the panel storage compartment;
    a door release mechanism carried by the device collar and adapted to normally retain the panel storage compartment door in the closed position; and
    a remote control adapted to remotely activate the door release mechanism whereby the door release mechanism releases the panel storage compartment door to the open position and the restraining panel deploys to a functional position beneath the panel storage compartment door and the feet of the animal tread on the restraining panel such that the restraining panel prevents the animal from stepping forward or rearward.

11. The remote animal restraining device of claim 10 wherein the device collar comprises a first semicircular collar segment and a second semicircular collar segment carried by and openable with respect to the first collar segment.

12. The remote animal restraining device of claim 10 wherein the restraining panel comprises fabric.

13. The remote animal restraining device of claim 10 wherein the restraining panel comprises a netting material.

14. The remote animal restraining device of claim 10 wherein the restraining panel is generally elongated and rectangular.

15. The remote animal restraining device of claim 10 further comprising at least one panel weight carried by the restraining panel.

16. The remote animal restraining device of claim 10 wherein the at least one panel storage compartment door comprises a pair of panel storage compartment doors.

17. The remote animal restraining device of claim 10 further comprising a CPU interfacing with the door release mechanism, a receiver interfacing with the CPU and a transmitter in the remote control and adapted to transmit an activation signal to the receiver.

18. The remote animal restraining device of claim 10 further comprising a harness and wherein the device collar is part of the harness.

19. A remote animal restraining method, comprising:
    providing a remote animal restraining device having a device collar and a restraining panel selectively releasable from the device collar;
    placing the device collar of the remote animal restraining device around the neck of an animal; and
    remotely deploying the restraining panel from the device collar in front of the front legs and feet of the animal to stop the animal from walking or running, wherein the restraining panel remains attached to the device collar and the feet of the animal tread on the restraining panel such that the restraining panel prevents the animal from stepping forward or rearward.

20. The remote animal restraining method of claim 19 further comprising removing the device collar from the animal and returning the restraining panel to a folded or compressed pre-release storage configuration.

* * * * *